United States Patent Office 3,232,907
Patented Feb. 1, 1966

3,232,907
DICYCLIC ACETAL POLYMERS AND PROCESS
FOR THEIR PREPARATION
Heinz F. Reinhardt, Wilmington, Del., assignor to E. I.
du Pont de Nemours and Company, Wilmington, Del.,
a corporation of Delaware
No Drawing. Filed Apr. 9, 1962, Ser. No. 185,804
31 Claims. (Cl. 260—67)

This invention relates to a new chemical process for preparing di(1,3-cyclic acetal-2)alkanes. It further relates to a process for preparing ω-(1,3-cyclic acetal-2)-alkanals. It further relates to a new class of intralinear dicyclic acetal polymers.

The process of this invention comprises condensing (a) at least one polyol having at least two hydroxyl groups attached to different carbon atoms free of benzenoid unsaturation with (b) a cycloaliphatic alkoxypyran compound preferably of the class consisting of 2-alkoxy-3,4-dihydropyrans and 2,6-dialkoxytetrahydropyrans in an acidic medium while removing therefrom the alkanol corresponding to said alkoxy radicals.

In the preparation of alkanes and alkanals, depending on the molar ratios of ingredients used, one or both of the following general reactions can occur; for example, with a preferred 2-alkoxy-3,4-dihydropyran:

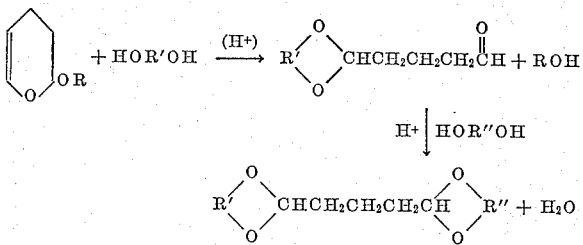

in which:

R is an alkyl group;
R' and R" are divalent alkenylene, alkylene, substituted alkylene, or cycloalkylene radicals.

In the general reaction illustrated above, the preferred 2-alkoxy-3,4-dihydropyran can be replaced mol for mol by other alkoxypyrans such as the 2,6-dialkoxytetrahydropyrans and ring-substituted 2-alkoxy-3,4-dihydropyrans and 2,6-dialkoxytetrahydropyrans. Thus, at or about a 1 to 1 molar ratio of cycloaliphatic alkoxypyran to diol or triol, a γ-(1,3-cyclic acetal-2)butanal will result; and at or about a 1 to 2 ratio respectively, a di(1,3-cyclic acetal-2)propane will result. In the latter kind of compound, the cyclic acetal moieties can be the same or different. When they are the same, the compound can be named as a 2,2'-trimethylene-bis-(1,3-cyclic acetal). Where the polyol is a tetrol, a 1 to 2 molar ratio of tetrol to a hydropyran yields a bis-butanal. At a 1 to 1 molar ratio polymers primarily are formed with little or no butanal. The number 2 in the term acetal and its equivalents is used for purposes of nomenclature to indicate that the attachment to the rest of the molecule is at the 2-carbon atom of the acetal ring: e.g.

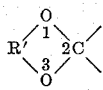

This process is carried out in an acidic medium, preferably in a pH range of 2 to 7 and more preferably in a pH range of about 3 to 6. Traces of acids in the reaction mass are accordingly used, such as hydrochloric, phosphoric, sulfuric, p-toluene sulfonic, acetic, trichloroacetic and oxalic. Provisions for heating the reacting mass from 40° C. to 200° C. are desirable so that the reaction can be carried out at reflux while removing the generated alkanol. Addition of high boiling solvents, toluene, xylene, etc. facilitates the removal of the alkanol and water. The reaction mass can then be fractionally distilled at reduced pressure to provide substantially pure products of the reactions shown above.

As can be seen from the general reaction diagrammed above, this process can be carried out in a stepwise fashion so as to produce novel asymmetrical dicyclic acetal alkanes. Thus, stepwise addition and substantially complete condensation of a molar equivalent of one polyol to the pyran in the first reaction step before adding the next (and different) polyol, produces these novel alkanes (e.g. Examples V and VI below). Stepwise addition and condensation of less than molar equivalents of each polyol with the pyran leads generally to mixtures of various symmetrical and asymmetrical acetal-substituted products.

Suitable polyols having hydroxyls attached to different carbon atoms free of benzenoid unsaturation which can be used in this process are shown in the following list. Particularly useful are those polyols in which the hydroxyl groups are on carbon atoms separated by not more than two other carbon atoms. In the case of cycloaliphatic diols, the hydroxyl groups are preferably vicinal. Mixtures of these polyols further can be used.

Ethylene glycol
1,2-propanediol
1,3-propanediol
1,2-butanediol
1,3-butanediol
1,4-butanediol
1,5-pentanediol
Divinylethylene glycol
Monovinylethylene glycol
2,4-pentanediol (i.e. 1,3-dimethylpropanediol-1,3)
2,3-hexanediol (i.e. 1-methylpentanediol-1,2)
3-allyloxypropanediol-1,2
Diphenylethylene glycol
Cyclohexylethylene glycol
Monopropenylethylene glycol
Dipropenylethylene glycol
Tetramethylethylene glycol
Glycerol
1,2,5-pentanetriol
1,2,6-hexanetriol
1,2,5,6-hexanetetrol
Trimethylolpropane monomethyl ether
Pentaerythritol monomethyl ether
Pentaerythritol dimethyl ether
Pentaerythritol diallyl ether
Cyclohexanediol-1,2
Butenediol-1,4

The cycloaliphatic alkoxy pyran compounds that can be used in this process include the 2-alkoxy-3,4-dihydropyrans and 2,6-dialkoxytetrahydropyrans in which the ethoxy groups of the ethoxy pyrans used in the examples hereinafter are replaced by methoxy, propoxy, butoxy or higher. Ethoxy and methoxy are preferred because of the more rapid removal of the alcohol during the reaction. The pyran rings can carry substituents that do not interfere with the reaction, such as methyl, ethyl or propyl as well as chloro or cyano groups, preferably in the 2, 4, 5 and 6 positions. Such starting materials are derived from the condensation of the appropriate unsaturated aldehyde with an α,β-unsaturated ether. Thus, for example, methacrolein can react with vinyl ethyl ether or with isopropenyl ethyl ether to produce respectively 2-ethoxy-5-methyl-3,4-dihydropyran and 2- ethoxy-2,5-dimethyl-3,4-dihydropyran. Other α,β unsaturated aldehydes and ketones can be used such as ethacrolein, chloracrolein, crotonaldehyde, methyl vinyl ketone, ethyl vinyl ketone, methyl isopropenyl ketone, 3-hexen-2-one as set forth, for example, in U.S. 2,514,168, Smith et al., July 4, 1950.

The alkanes and alkanals of this invention have a wide range of utilities. Those dicyclic acetal alkanes that possess vinyl groups are uniquely adapted as in Example XI to preparation of air drying vehicles for protective and decorative coatings. Those dicyclic acetal alkanes with residual hydroxyl groups as in Example II are useful in preparation of polyester and polyurethane resins. Dicyclic acetal alkanes free of reactive groups are particularly useful as plasticizers for cellulosic, acetal and vinyl type polymers. The cyclic acetal and vinyl type polymers. The cyclic acetal butanals similarly can serve as solvents and plasticizers for various resins. Their reactive aldehyde groups in turn permit these butanal compounds to be used as intermediates in the preparation of acetal-substituted monobasic acids and alcohols. Those compounds having a hydrogen atom at the 2-position of the acetal ring can further be oxidized to yield hydroperoxides as initiators for vinyl polymerizations. The cyclic acetal butanals in particular have appreciable olfactory value in compounding scents, perfumes and odor-masking agents.

A novel class of intralinear non-spiro cyclic acetal polymers, i.e., the cyclic acetal rings are not united by a carbon atom common to both acetal rings, can be made by these reactions. Thus, the reaction between molar equivalent amounts of the alkoxypyrans and polyols having at least four hydroxyl groups and preferably not more than eight hydroxyl groups (and preferably those having vicinal or near-vicinal hydroxyl groups, i.e.,

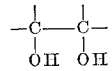

or

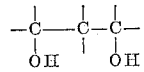

especially such tetrols) produce polymers by condensation and ring opening. Where these polyols are selected having the pairs of vicinal or near-vicinal hydroxy groups substantially removed from each other, e.g., as in 1,2,5,6-hexanetetrol or 1,2,6,7-heptanetetrol, polymers can be prepared that are, surprisingly, soluble and tractable, and are particularly useful for protective and decorative coatings and for adhesives. By contrast, those polyols having the pairs of hydroxy groups close together, e.g. pentaerythritol, yield insoluble, or difficultly tractable high melting polymers believed to contain predominantly spiro cyclic acetal rings and are thereby best adapted to coatings for electrical applications, e.g. condensers, rather than to conventional protective or decorative coating applications requiring more fluid or soluble vehicles.

In contrast, the non-spiro 1,3-cyclic acetal polymers of this invention are readily tractable and comprise recurring units represented by the following structural formula:

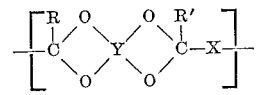

in which

R and R′ are hydrogen or $C_1$–$C_4$ alkyl;
Y is a tetravalent radical corresponding to a polyol devoid of four hydroxy groups and having no single carbon atom common to both cyclic acetal rings;
X is a divalent alkylene radical.

In the above structural representation, the R, R′ and X radicals are derived from the hydropyran used in the condensation. Thus, for a 2-alkoxy-3,4-dihydropyran or a 2,6-dialkoxytetrahydropyran, X is trimethylene and R and R′ are hydrogen. For 2,3-dimethyl-2,6-dialkoxytetrahydropyran, X is an alkyl-substituted propylene, e.g., 1-methylpropylene and R and R′ are methyl radicals. Hydropyrans substituted with other $C_1$–$C_4$ alkyl groups, including ethyl, propyl and butyl, on the 2–6 positions of the pyran ring can be used.

The tetravalent radical Y is determined by the polyol used. These polyols in turn are preferably selected from classes best described as alkane, oxydialkane or cycloaliphatic tetrols. In this specification, a tetrol is defined as an organic compound having four hydroxyls attached to carbon atoms free of benzenoid unsaturation. Thus, these tetrols distinguish from the phenols and higher aromatic hydroxy compounds having the hydroxy groups directly attached to the aromatic or aryl ring.

The polyols that can be used in this invention are classed broadly as follows:

The alkanetetrols comprise those compounds having the hydroxyl groups attached to straight or branched chain alkanes free of substituents which can interfere with the condensation reaction. Hexanetetrols, heptanetetrols, octanetetrols, pentanetetrols, butanetetrol, 4-methylheptanetetrol-1,2,6,7, 4-phenylheptanetetrol-1,2,6,7, and sorbitol diacetate are examples.

The oxydialkane tetrols refer to those compounds in which the attached hydroxyl groups are distributed along at least two alkane chains and these chains are in turn separated by at least one oxygen atom. Thus, diglycerol ether, 4-oxaoctanetetrol-1,2,7,8, 4,4′-isopropylidene-bis-phenylglyceryl ether, 3,3,5,5-tetramethyloltetrahydropyran, and the p-(2,3-dihydroxypropyl)phenyl glyceryl ethers are representative examples.

The cycloaliphatic tetrols are those compounds which have at least two of the hydroxyl groups vicinal and attached directly to a cycloaliphatic ring. Menthanetetrol-1,2,8,9-cyclohexanetetrol, tetrahydroxydicyclopentane, 4-(α,β-dihydroxyethyl)cyclohexanediol - 1,2, ethylenedioxy-bis-dicyclopentanediol-2,3 and carbonyloxymethylene-bis-(3,4-dihydroxy-6-methylcyclohexane) are examples of the latter category.

Other polyols having more than four hydroxy groups but usable herein as tetrols can also be used. Such compounds are sorbitol, mannitol, triglycerol ether, or the hydrolyzed condensates of (a) diphenylolpropane or dicyclohexanolpropane with (b) double molar amounts of epichlorohydrin.

The polymers of this invention vary from viscous liquids to semi-crystalline or resinous solids and are useful for adhesive, protective and decorative coatings on metals, plastics, paper, ceramics, etc. They can be used alone or in combination with other types of resins such as alkyd, phenol/formaldehyde, vinyl ester, acrylic and methacrylic ester, vinyl acetal and hydrocarbon. Solvents, pigments and other ingredients common in the coating art are also useful with these materials and compositions both as solutions and as dispersions.

The following examples, in which parts are expressed by weight, illustrate the process and polymers of this invention.

*Example I*

A round bottom vessel is fitted with thermometer, heating unit, agitator, reflux condenser, continuous water separator, and provisions for adding ingredients and for vacuum distillation. To this is charged 570 parts (5.0 mols) of divinyl ethylene glycol, followed slowly by 256 parts (2.0 mols) of 2-ethoxy-3,4-dihydropyran containing a trace of dissolved HCl gas to a pH of about 3 and about 0.05 part of hyroquinone. Then 200 parts of toluene are added and the vessel closed and heated to about 90° C. so that the alcohol and water/toluene azeotropes are distilled off. After about 30 minutes, an additional 100 parts of toluene are added and refluxing and azeotrope-stripping continued for another 20 minutes. The pressure is then reduced slightly so that the excess toluene and divinyl ethylene glycol are stripped off and then the product is distilled over at 118°–119° C. at 0.15 mm. Hg. The product is 2,2'-trimethylene-bis-(4,5-divinyl-1,3-dioxolane).

*Example II*

Using the type of equipment described in Example I, 268 parts (2.0 mols) of hexantriol-1,2,6, and 128 parts (1.0 mol) of 2-ethoxy-3,4-dihydropyran and about 0.25 part of 85% phosphoric acid to a pH of about 5 are charged to the vessel. The contents are heated with stirring to about 100° C. so that the ethanol formed can be distilled over. Heating is continued for about 2 hours until all the ethanol is removed (about 46 parts). The product remaining is stripped of low boiling material at reduced pressure and then cooled. The product is a light yellow viscous material identified as 2,2'-trimethylene-bis-(4-(4-hydroxybutyl)-1,3-dioxolane).

*Example III*

In equipment similar to Example I, 261 parts (1.5 mols) of 2,6-diethoxytetrahydropyran, and 171 parts (1.5 mols) of divinyl ethylene glycol having a few bubbles of HCl gas dissolved therein, to a pH of 4 are charged. The contents are heated to about 88° C. when ethanol starts to distill over. After about 2½ hours, the evolution of ethanol is complete, the reaction mass is cooled and stirred with 20 parts of anhydrous potassium carbonate for about one hour, filtered and then the product distilled at reduced pressure. The fraction distilling from 99° C. to 116° C. at 2.5 mm. Hg is collected and redistilled with added hydroquinone on a spinning band column and the cut from 71–76° C. at 0.15–0.20 mm. Hg collected and identified as γ-(4,5-divinyl-1,3-dioxolane-2)butanal. A second portion of the reaction mixture is fractionated and a fraction from 125–140° C. at 1–2 mm. Hg is taken. Hydroquinone is added and the fraction redistilled at about 124° C. at 0.1 mm. Hg to yield 2,2'-trimethylene-bis-(4,5-divinyl-1,3-dioxolane).

*Example IV*

A three-necked flask fitted with thermometer, still head, and agitator is charged with 176 parts (2.0 mols) of 2-butene-1,4-diol, 174 parts (1.0 mol) of 2,6-diethoxytetrahydropyran, and 2 parts of HCl gas are bubbled in to a pH of 3. The contents are heated to about 94° C. and the evolved ethanol distilled off. After about 70 minutes, the reaction is complete, the reaction mixture allowed to cool and the contents extracted twice with 100 parts of a 5% aqueous NaOH solution. Toluene (120 parts) is then added and the organic layer washed several times with water, separated and then dried over anhydrous sodium sulfate. The product is distilled at 144–146° C. at 0.4 mm. Hg, and the distillate has a melting point of 37–38° C. and is identified as 2,2'-trimethylene-bis-(1,3-dioxepene).

*Example V*

In Example III, molar equivalent portions of 2,6-diethoxytetrahydropyran and divinyl ethylene glycol are condensed to form γ-(4,5-divinyl-1,3-dioxolane-2)butanal. To 98 parts (0.5 mol) of this butanal in a three-necked flask are added 31 parts (0.5 mol) of ethylene glycol and 0.3 part of p-toluene sulfonic acid in 130 parts of toluene. The flask is then fitted with a reflux column and water separator and heated for about 40 minutes at 125° C. After about 9 parts of water are collected, the toluene is stripped off and the product distilled at reduced pressure. The fraction distilling at 108–112° at 0.5 mm. Hg is identified as the di(1,3-cyclic acetal-2)alkane: 1-(1,3-dioxolan-2-yl)-3-(4,5-divinyl-1,3-dioxolan-2-yl)propane.

*Example VI*

In the equipment of Example I is charged 384 parts (3.0 mols) of 2-ethoxy-3,4-dihydropyran. To this is slowly added over a 20-minute period as a first step, 150 parts of anhydrous ethanol containing a small amount of HCl gas to a pH of about 5. At the end of 20 minutes, the contents have reached about 80° C. and are stirred for about an hour without further heating to yield 2,6-diethoxy-3,4-dihydropyran. Then as the second step, 264 parts (3.0 mols) of vinylethylene glycol are added, the contents of the vessel refluxed, and the evolved ethanol (about 255 parts) distilled off at about 78° C. over a period of about two hours. The reaction product is cooled, stirred 30 minutes with 10 parts of anhydrous potassium carbonate, filtered and then fractionally distilled. The cut taken at 75° C. and 0.75 mm. Hg is a clear, colorless liquid identified as γ-(4-vinyl-1,3-dioxolane-2)-butanal. The cut taken at 117° C. and 0.8 mm. Hg is a slightly yellow, clear liquid identified as 2,2'-trimethylene-bis-(4-vinyl-1,3-dioxolane).

The butanal product of this example is in turn condensed with an equimolar amount of 1,2-propanediol in the presence of benzene and a trace of p-toluene sulfonic acid to yield a di(1,3-cyclic acetal-2)alkane: 1-(4-methyl-1,3 - dioxolan - 2-yl)-3-(4-vinyl-1,3-dioxolan-2-yl)propane which distills at 122–125° C. at 0.9 mm. Hg.

*Example VII*

In equipment similar to that of Example I are charged 131 parts (1.0 mol) of 2-methoxy-4-methyl-3,4-dihydropyran containing a trace of HCl gas. To this is added slowly with stirring 166 parts (2.0 mols) of monovinylethylene glycol. After the exothermic reaction has ceased, the mixture is heated and stirred for several hours to remove the evolved water and methanol and then several parts of potassium carbonate are added to neutralize the acid and the reaction mass is filtered. Thereafter, the filtrate is fractionated at about 0.75 mm. Hg and the cyclic acetal alkane product 2,2'-(2-methyltrimethylene)-bis-(4-vinyl-1,3-dioxolane) is recovered. Other substituents on the trimethylene chain, e.g., ethyl, propyl, chloro and cyano can be also introduced via substituting the corresponding ring-substituted alkoxydihydropyran or dialkoxytetrahydropyran on an equimolar basis for the 2-methoxy-4-methyl-3,4-dihydropyran.

*Example VIII*

Using the equipment and technique of Example VII, 146 parts (1.0 mol) of 2-methoxy-5-ethyl-3,4-dihydropyran are reacted with 152 parts (2 mols) of 1,3-propanediol in an acid medium. An addition of 50 to 100 parts of toluene can optionally be used to aid in water and alcohol azeotrope removal and in filtration. The cyclic acetal alkane product is 2,2'-(1-ethyltrimethylene)-bis-(1,3-dioxane).

Replacement of the 1,3-propanediol in the above example by an equimolar amount of trimethylolpropane monomethyl ether results in a cyclic acetal alkane reaction product identified as 2,2'-(1-ethyltrimethylene)-bis-(5-ethyl-5-methoxymethyl-1,3-dioxane).

*Example IX*

Using the equipment and technique of Example VII, 85 parts (0.5 mol) of 2-isobutoxy-6-methyl-3,4-dihydropyran are reacted with 62 parts (1.0 mol) of ethylene glycol in an acid medium. The reaction product is the dicyclic acetal alkane: 1-(1,3-dioxolan-2-yl)-3-(2-methyl-1,3-dioxolan-2-yl)propane.

Repeating this example, using only 31 parts (0.5 mol) of ethylene glycol, produces the cyclic acetal alkanal: γ-(2-methyl-1,3-dioxolan-2-yl)butanal.

*Example X*

Using the equipment and technique of Example I, 0.5 gram mol of 1,4-butanediol is reacted with 0.5 gram mol of 2-ethoxy-3,4-dihydropyran in an acid medium. The cyclic acetal alkanal γ-(1,3-dioxepan-2-yl)butanal results. Addition and condensation of a second 0.5 gram mol portion of the 1,4-butanediol yield the cyclic acetal alkane: 2,2'-trimethylene-bis-(1,3-dioxepane).

*Example XI*

Using the equipment of Example I, 66.0 parts (0.5 mol) of 3-allyloxypropanediol-1,2 and 43.5 parts (0.25 mol) of 2,6-diethoxytetrahydropyran previously mixed with about 0.2 part of 85% phosphoric acid are charged to the vessel. The mixture is heated and stirred under a blanket of nitrogen over a period of about 4 hours to a temperature of 132°–142° C. The low boiling materials distill off at 76°–80° C. The mixture is cooled to room temperature, diluted with about 110 parts of diethyl ether and washed twice with 150 parts of 5% aqueous potassium carbonate. The organic layer is separated, dried over anhydrous sodium sulfate, filtered and then stripped of low boiling materials at successively higher temperatures up to 150° C. at 2 mm. Hg pressure. A light yellow, clear viscous product results identified as 2,2'-trimethylene-bis-(4-allyloxy-1,3-dioxolane) which on redistillation at 160°–162° C. at 0.4 mm. Hg has an index of refraction of about 1.4672 at 25° C.

Five parts of the above product are mixed with about 0.20 part of a xylene solution of cobalt butyl phthalate having 10 mg. Co++/ml. and cast with a doctor knife as a 2 mil film on a glass panel. The coating air dries to a clear, tack-free, glossy colorless coating in five to six hours.

*Example XII*

Using the equipment of Example I, 27.2 parts (0.2 mol) of pentaerythritol, 50 parts of xylene and 36.8 parts (0.2 mol) of 2,6-diethoxytetrahydropyran are charged to the vessel, blanketed with nitrogen, a few bubbles of dry HCl gas are dissolved in the liquid and then the contents heated, with stirring, up to 137° C. for about two hours. The low boiling material is stripped off at 75°–78° C. as the reaction proceeds and finally the xylene is removed at reduced pressure. A white powder remains in the vessel. The powder is removed and melts at about 235° C. on a metal panel to a colorless liquid which on cooling leaves a resinous, somewhat brittle, clear coating.

*Example XIII*

Using the equipment of Example I, 30 parts (0.2 mol) of 1,2,5,6-hexanetetrol, 36.8 parts (0.2 mol) of 2,6-diethoxytetrahydropyran, 50 parts of xylene and 0.2 part of 85% phosphoric acid are charged to the vessel and slowly heated under a nitrogen blanket up to a temperature of about 135° C. over a period of 2 hours, distilling out the low boiling materials at 75°–80° C. as the reaction proceeds. The charge is then cooled, 5 parts of potassium carbonate are stirred in, and the solution filtered. A clear, viscous xylene solution remains, which when coated and baked at 130° C. for 30 minutes on a metal panel produces a clear, resinous, slightly tacky coating.

The resin produced above is identified by its infrared spectra as a linear dicyclic acetal polymer having predominantly units of the following structure:

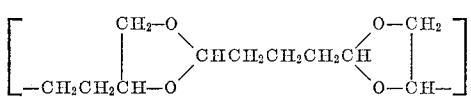

*Example XIV*

Using the equipment of Example I, 24.9 parts (0.15 mol) of diglycerol ether, 26.1 parts (0.15 mol) of 2,6-diethoxytetrahydropyran, 45 parts of xylene and about 0.2 part of 85% phosphoric acid are reacted together for a period of about 2 hours, removing the evolved ethanol as the pot temperature is increased slowly to about 135° C. The charge is then cooled and 10 parts of potassium carbonate are stirred in and then the solution is filtered.

A light yellow resin solution in xylene having a viscosity of about 1.8 poises remains. The solution, coated and dried on a panel, leaves a clear resinous coating having excellent pressure sensitive adhesive properties identified as being predominantly units of the following structure:

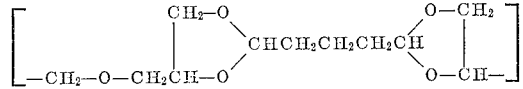

Replacing all or part of the tetrol used in Examples XIII and XIV by a molar equivalent amount of one, or a blend of two or more, of the following polyols, yields polymeric products having non-spiro-1,3-cyclic acetal recurring units.

Heptanetetrol-1,2,6,7
4-methylheptanetetrol-1,2,6,7
4-oxaoctanetetrol-1,2,7,8
Diglycerol ether
Hexanetetrol-1,2,5,6
Tetramethylolethane
3,3,5,5-tetramethyloltetrahydropyran
4,4'-methylene-bis-(β,γ-dihydroxypropiophenone)
Tetrahydroxydicyclopentane
4(α,β-dihydroxyethyl)cyclohexanediol-1,2
Ethylenedioxy-bis-dicyclopentanediol-2,3
p-Menthanetetrol-1,2,8,9
Sorbitol
Carbonyloxymethylene-bis-(3,4-dihydroxy-6-methylcyclohexane)
p-(2,3-dihydroxypropyl)phenyl glyceryl ether
Hydrolyzed condensate of diphenylolpropane and epichlorohydrin at about 1 to 2 molar ratio
Hydrolyzed condensate of dicyclohexanolpropane and epichlorohydrin at about 1 to 2 molar ratio The 2,6-dialkoxytetrahydropyran used above can be replaced by molar equivalent amounts of 2-alkoxy-3,4-dihydropyran and by various alkyl-substituted analogues of these compounds.

Though xylene is used as a process solvent in these examples, other inert solvents can also be used, preferably those boiling substantially above the boiling point of the liberated alkanol in order to facilitate the latter's removal. Dioxane, toluene, trichlorethylene and chlorobenzene are examples.

Solutions of the polymers made from the above tetrols are useful as protective coatings over metal, wood, paper and plastics and can be applied by conventional methods and air dried or baked at elevated temperatures.

I claim:

1. A process for preparing a cyclic acetal compound which comprises condensing in an acidic medium,
    (a) a compound selected from the class consisting of 2 - alkoxy - 3,4 - dihydropyrans and 2,6 - dialkoxytetrahydropyrans with
    (b) a polyol having at least two hydroxy groups attached to different carbon atoms free of benzenoid unsaturation,
removing alkanol formed, and separating said acetal compound.

2. A process for preparing a di(1,3-cyclic acetal-2)propane-1,3 which comprises condensing at a pH between 2 and 7,
    (a) a compound selected from the class consisting of 2 - alkoxy - 3,4 - dihydropyrans and 2,6 - dialkoxytetrahydropyrans with
    (b) at least one polyol having at least two hydroxy groups attached to different carbon atoms of an aliphatic chain, said polyol being selected from the class consisting of 1,2-diols, 1,3-diols and 1,4-diols,
the compounds of (a) and (b) being present in a molar ratio of about 1 to 2, removing alkanol formed, and separating the said propane.

3. A process for preparing γ(1,3-cyclic acetal-2)butanals comprising condensing, at a pH between 2 and 7 while removing the alkanol formed thereby, the compounds of classes (a) and (b) of claim 1 at a molar ratio of about 1 to 1.

4. The process of claim 1 in which 2,6-diethoxytetrahydropyran is condensed with 2,3-butenediol.

5. The process of claim 1 in which 2-ethoxy-3,4-dihydropyran is condensed with divinylethylene glycol.

6. The process of claim 1 in which 2-ethoxy-3,4-dihydropyran is condensed with 1,2,6-hexanetriol.

7. The process of claim 1 in which the polyol is a tetrol.

8. The process of claim 1 in which the polyol is pentaerythritol.

9. The process of claim 2 in which more than one diol is used, each diol being added and condensed stepwise.

10. The process of claim 2 in which 3-allyloxypropanediol-1,2 is condensed with 2,6-diethoxytetrahydropyran.

11. The process of claim 3 in which 2,6-diethoxytetrahydropyran is condensed with divinylethylene glycol.

12. The process of claim 9 in which 2-ethoxy-3,4-dihydropyran is condensed stepwise with molar equivalent amounts of divinylethylene glycol and ethylene glycol, respectively.

13. The process of claim 9 in which 2-ethoxy-3,4-dihydropyran is condensed stepwise with molar equivalent proportions of monovinylethylene glycol and propanediol-1,2, respectively.

14. A non-spiro-1,3-cyclic acetal polymer having recurring units of the structure

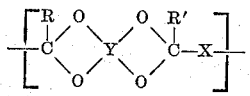

in which
R and R' are selected from the group consisting of hydrogen and $C_1$—$C_4$ alkyl;
Y is a tetravalent radical derived from a polyol having no carbon atom common to both cyclic acetal rings; and
X is a divalent alkylene radical,
prepared by reacting a compound selected from the group consisting of 2-alkoxy-3,4-dihydropyrans and 2,6-dialkoxytetrahydropyrans, with a polyol having at least four hydroxyl groups, in about a 1:1 molar ratio, in an acidic medium, until polymerization is complete, and then removing said polymer from the reaction mass.

15. The polymer of claim 14 in which the polyol used is diglycerol ether.

16. The polymer of claim 14 in which the polyol used is 1,2,5,6-hexanetetrol.

17. The polymer of claim 14 in which the polyol used is 1,2,6,7-heptanetetrol.

18. The polymer of claim 14 in which the polyol used is 4-methylheptanetetrol-1,2,6,7.

19. The polymer of claim 14 in which the polyol used is 4-oxaoctanetetrol-1,2,7,8.

20. The polymer of claim 14 in which the polyol used is tetramethylolethane.

21. The polymer of claim 14 in which the polyol used is 3,3,5,5-tetramethyloltetrahydropyran.

22. The polymer of claim 14 in which the polyol used is 4,4' - methylene - bis - (β,gamma - dihydroxypropiophenone).

23. The polymer of claim 14 in which the polyol used is tetrahydroxydicyclopentane.

24. The polymer of claim 14 in which the polyol used is 4-(α,β-dihydroxyethyl)cyclohexanediol-1,2.

25. The polymer of claim 14 in which the polyol used is sorbitol.

26. The polymer of claim 14 in which the polyol used is ethylenedioxy-bis-dicyclopentanediol-2,3.

27. The polymer of claim 14 in which the polyol used is carbonyloxymethylene - bis - (3,4 - dihydroxy - 6 - methyl-cyclohexane).

28. The polymer of claim 14 in which the polyol used is p-menthanetetrol-1,2,8,9.

29. The polymer of claim 14 in which the polyol used is p-(2,3-dihydroxypropyl)phenylglyceryl ether.

30. The polymer of claim 14 in which the polyol used is the hydrolyzed condensate of diphenylolpropane and epichlorohydrin in about a 1:2 molar ratio.

31. The polymer of claim 14 in which the polyol is the hydrolyzed condensate of dicyclohexanolpropane and epichlorohydrin in about a 1:2 molar ratio.

References Cited by the Examiner

UNITED STATES PATENTS

| | | | |
|---|---|---|---|
| 2,514,156 | 7/1950 | Geyer et al. | 260—67 |
| 2,542,610 | 2/1951 | Young | 260—2 |
| 2,640,815 | 6/1953 | Whetstone et al. | 260—67 |
| 2,870,121 | 1/1959 | Kraft | 260—67 |
| 2,913,435 | 11/1959 | Guest et al. | 260—67 |

FOREIGN PATENTS

| | | |
|---|---|---|
| 558,106 | 12/1943 | Great Britain. |
| 698,736 | 10/1953 | Great Britain. |

WILLIAM H. SHORT, *Primary Examiner.*

LEON J. BERCOVITZ, *Examiner.*